Nov. 15, 1955 A. BARTLETT 2,723,472
ADJUSTABLE IMPLEMENT MOUNTING FOR TRACTORS
Filed Oct. 2, 1951 3 Sheets-Sheet 1

INVENTOR.
ARMOR BARTLETT
BY
F. R. Geisler.
ATTORNEY

Nov. 15, 1955 A. BARTLETT 2,723,472
ADJUSTABLE IMPLEMENT MOUNTING FOR TRACTORS
Filed Oct. 2, 1951 3 Sheets-Sheet 2
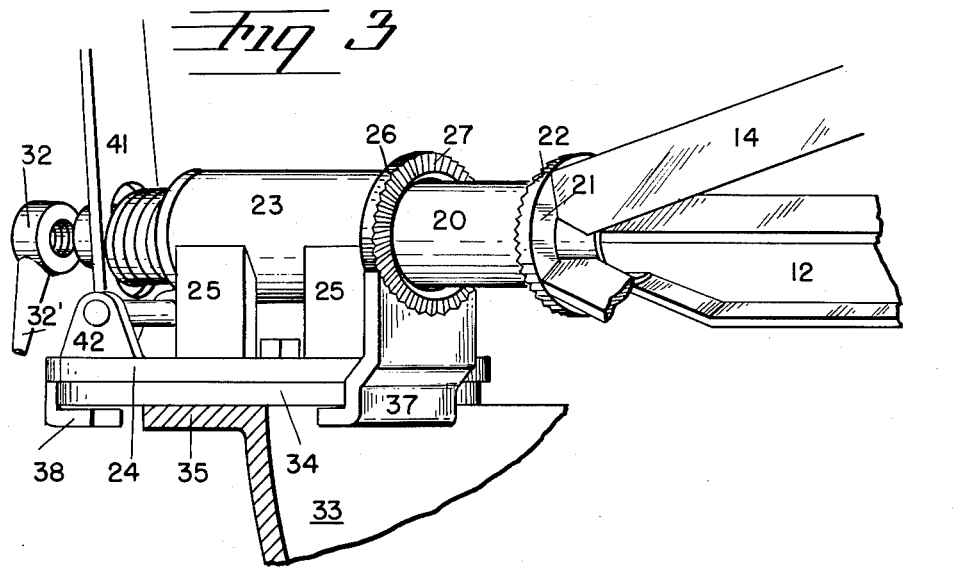
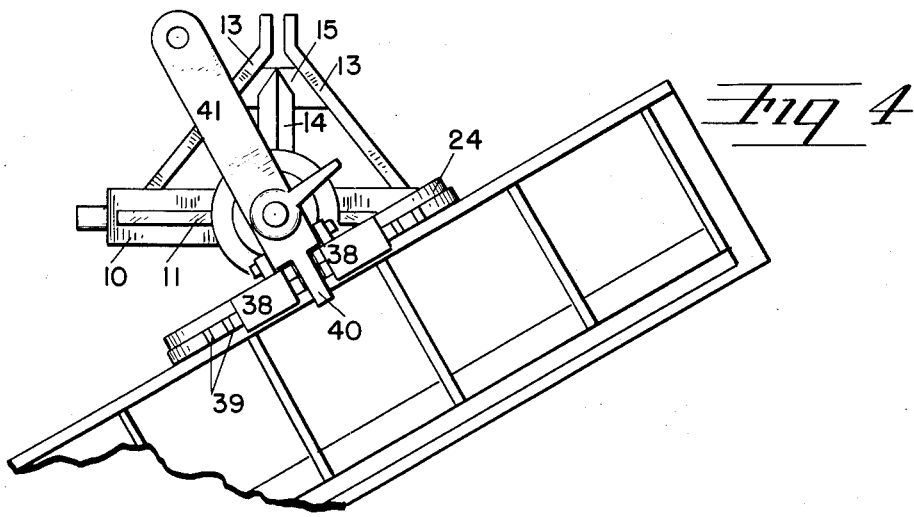
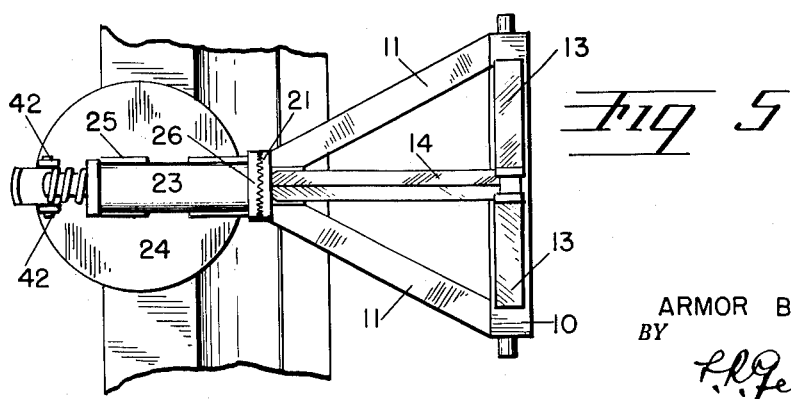
INVENTOR.
ARMOR BARTLETT
BY
F. R. Geisler.
ATTORNEY

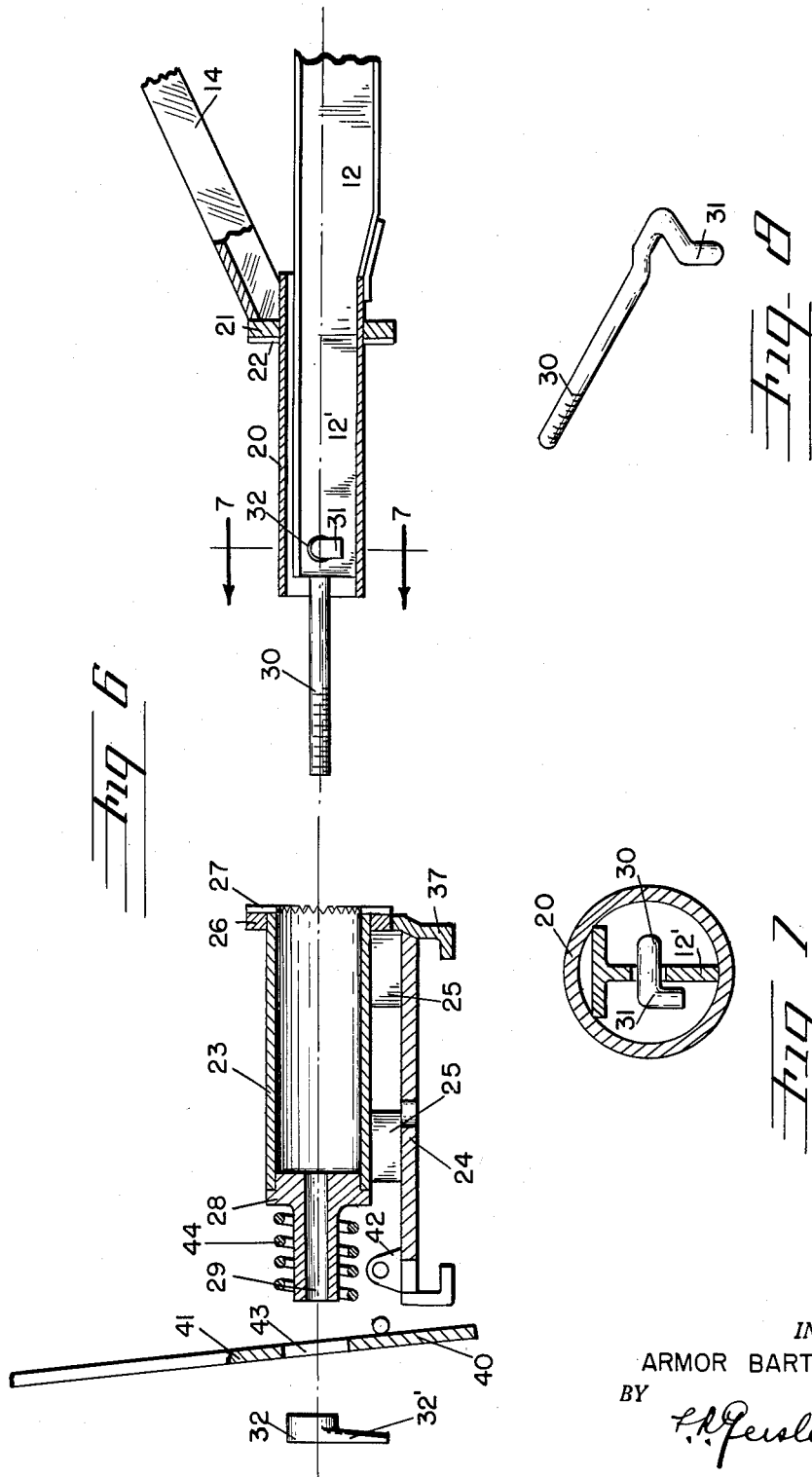

United States Patent Office 2,723,472
Patented Nov. 15, 1955

2,723,472
ADJUSTABLE IMPLEMENT MOUNTING FOR TRACTORS

Armor Bartlett, Vancouver, Wash.

Application October 2, 1951, Serial No. 249,292

3 Claims. (Cl. 37—156)

This invention relates to means whereby ground-working blades and similar implements may be attached to tractors to enable the tractor to perform various ground-working operations, such as bull-dozing, ditching, grading, scraping, and the like.

An object of this invention is to provide simple and improved means whereby a ground-working blade, or similar implement, may be quickly and easily attached to, and subsequently detached from, a tractor.

Another object of this invention is to provide an improved mounting for a ground-working blade, as an attachment for a tractor, which will be capable of holding the blade, or similar ground-working implement, in various adjusted positions as desired to suit the particular type of ground work to be performed.

A further object of this invention is to provide a simple, practical mounting on a tractor for a ground-working implement through the medium of which the implement, while attached to the tractor, may be quickly and easily adjusted to various positions.

The improved adjustable implement mounting, by means of which these objects and other advantages are attained, is hereinafter described with reference to the accompanying drawings, in which:

Fig. 1 is a side elevation showing my implement mounting in place on a tractor and in turn supporting a ground-working blade, the blade being shown in position for scraping or terracing;

Fig. 2 is a sectional elevation of the implement mounting of Fig. 1 along the longitudinal center of the same and drawn to a larger scale;

Fig. 3 is a fragmentary perspective view showing the two main portions of my implement mounting partly separated or in unlocked position;

Fig. 4 is a rear view of the implement mounting and ground-working blade of Figs. 1 and 2, with the ground-working blade adjusted to a position for ditching;

Fig. 5 is a fragmentary top plan view of my attachment;

Fig. 6 is an exploded view showing the principal members of my implement mounting in longitudinal sectional elevation and separated from each other, but arranged in their relative positions;

Fig. 7 is a section on line 7—7 of Fig. 6 drawn to a larger scale; and

Fig. 8 is a perspective view of the link bolt for holding the two main portions of the implement mounting together.

Referring first to Figs. 1 and 5, a triangular-shaped frame is composed of a forward cross bar 10 (Fig. 5), a pair of converging side bars 11, 11, a longitudinally-extending center bar 12, a pair of converging bracket arms 13, 13 extending upwardly from the ends of the cross bar 10 and joined near the upper ends by a bracket plate 15 (Fig. 4), and a tie bar 14 extending from the center bar 12 to the bracket plate 15.

This triangular-shaped frame is adapted to be mounted at the rear of an ordinary tractor T (Fig. 1) by a three-point connection. A pair of lift arms 16 at each side (one of which is shown in Fig. 1) have their front ends pivotally connected to the tractor and their rear ends pivotally connected to the ends of the forward cross bar 10 of the triangular-shaped frame. A pair of positioning levers 17, mounted on the tractor T and operated from the tractor, are connected by links 18 with the lift arms 16. A link 19 (Fig. 1), the forward end of which is adjustably and movably mounted on the tractor T, has its rear end pivotally connected to the upper ends of the bracket arms 13.

The center bar 12 (Figs. 2, 3 and 6) of the triangular-shaped frame has a rear extension portion 12' which is slightly reduced in height, as shown in Figs. 2 and 6, and over which a tubular member 20 is rigidly mounted. The interior diameter of the tubular member 20 corresponds approximately to the height of the extension portion 12' and the member 20 is firmly secured on the extension portion 12' by welding or by any other suitable means. A ring 21 is welded on the outer surface of the tubular member 20 near the forward end of the latter. The rear face of this ring 21 is formed with a series of radial grooves or teeth 22, the purpose of which will be presently explained.

A sleeve 23, adapted to be slid over the tubular member 20, carries a circular base plate 24 which is rigidly secured to the sleeve by internal brackets 25 (shown most clearly in Figs. 1 and 3). A ring 26, corresponding in size to the ring 21 previously described (Figs. 3 and 6), is welded, or otherwise rigidly secured, on the forward end of the sleeve 23, and the forward face of this ring 26 is formed with a series of radial grooves or teeth 27 (shown most clearly in Fig. 3), corresponding to, and adapted to mesh with, the teeth 22 of the ring 21.

The rear end of the sleeve 23 has an end section 28 (Figs. 2 and 6) of smaller external diameter, which end section is welded, or otherwise rigidly secured, to the end of the sleeve 23, or may be formed integral with the sleeve 23. An axial channel 29 extends through the end section 28.

A link bolt 30, the shape of which is shown most clearly in Fig. 8, has one end formed into a hook with a double right angle bend 31 to enable this end to be hooked through an aperture 32 (Fig. 6) in the rear extension portion 12' of the center bar 12 in the tubular member 20. The shank of the link bolt 30 is of slightly less diameter than the diameter of the channel 29 extending through the end section 28 on the sleeve 23. Thus when the sleeve 23, and with it the base plate 24 (and the ground-working blade as later described), are attached to the triangular-shaped frame, the sleeve 23 is slid over the tubular member 20 and the link bolt 30 is thrust through and beyond the channel 29. The end portion of the link bolt 30 is threaded and is adapted to be engaged by a clamping nut 32 which preferably is formed with a hand-hold extension 32' to facilitate tightening or loosening of the nut and link bolt.

An adjustable blade assembly, designated as a whole by the reference character 33, has a central top mounting plate 34 which is adapted to be rotatably positioned below the base plate 24 of the sleeve assembly and concentric with the base plate 24. The base plate 24 and the mounting plate 34 and top portion 35 of the blade in the blade assembly 33 each has a center aperture through which a pivot bolt 36 (Fig. 2) extends, by means of which the blade assembly 33 is pivotally attached to the base plate 24 of the sleeve assembly. A holding bracket 37 (Figs. 1, 2 and 3) extends down from the sleeve 23 over the front edge of the base plate 24 and has a bottom flange spaced below the base plate 24 so as to extend over the mounting plate 34 and serve as a retaining means for the mounting plate 34 at that side. A corresponding flanged member 38 is secured to, and extends down over, the base plate 24 at the opposite or rear edge for similarly serving as a retaining means and for the blade assembly mounting plate 34.

The periphery of the mounting plate 34 is formed with a series of notches 39, each adapted for engagement by the bottom portion 40 of a locking lever 41, and the flanged member 38 has a corresponding vertical slot in order to permit movement in and out of the bottom portion 40 of the locking lever 41. The locking lever 41 is pivotally mounted on a hinge pin supported by a pair of ears 42 extending up from the base plate 24. A large aperture 43 (Figs. 2 and 6) in the locking lever 41 permits it to move freely over the reduced end section 28 of the sleeve 23. A compression spring 44 normally holds the lever 41 in the locking position shown in Fig. 2 but permits the lever 41 to be moved to unlocking position against the force of spring 44 and thus to the broken line position indicated in Fig. 2, when the blade assembly is to be rotated with respect to the base plate 24 of the sleeve 23.

Thus the blade assembly 33, when mounted below the base plate 24 of the sleeve 23, can be given partial rotation with respect to the base plate and sleeve to any desired position of angularity relative to the direction of travel of the tractor, and when such adjustment is to be made the lever 41 is pushed to unlocking position against the force of the spring 44, the release of the lever then causing it again to resume locking position under the action of the spring 44 when the adjustment has been made.

When sleeve 23 is mounted on the tubular member 20 and the clamping nut 32 is tightened, the forcible engagement of the teeth of the sleeve ring 26 with the teeth on the opposed face of the staionary ring 21 prevents any rotation of the sleeve 23 on the mounting and consequently prevents any tipping of the blade assembly 33 with respect to the triangular-shaped frame. In some ground-working operations, as for example in ditching, the blade must be tilted from the horizontal position, for example to some such position as illustrated in Fig. 4. Such adjustment of the blade position is very quickly and easily accomplished with my invention. All that is necessary is to loosen the clamping nut 32, so as to enable the sleeve 23 to be moved axially sufficiently to cause the opposed toothed faces of the rings 26 and 21 to be separated. Then the sleeve 23, and with it the entire blade assembly and ground-working blade can be given partial rotation until the blade is brought into the tipped position desired. Then the tightening of the clamping nut 32 will cause the sleeve 23 and blade assembly to be held securely in such desired position.

I claim:

1. An adjustable element mounting for use with a tractor including a triangular-shaped frame adapted to be secured on the rear of the tractor, a central rearwardly-extending portion on said frame, a tubular member on said rearwardly-extending portion, a sleeve slidable over said tubular member, a base plate rigidly connected with said sleeve, a ground-working blade assembly rotatably attached to said base plate, locking means for holding said blade assembly against rotation with respect to said base plate, a ring on the forward end of said sleeve, radially-extending teeth on the forward face of said ring, radially-extending engaging elements on said tubular member adapted for engagement with said teeth of said ring on said sleeve when said sleeve is mounted in position on said tubular member, an end section at the rear of said sleeve of reduced external diameter, an axial channel extending through said end section, a clamping bolt connected to said rearwardly-extending portion of said frame and extending through said channel, a clamping nut on the outer end of said bolt for exerting a forward thrust on said sleeve, to cause said ring on the forward end of said sleeve to be held firmly in engaging contact with said radially-extending engaging elements on said tubular member, whereby, upon the loosening of said clamping nut, said sleeve can be given rotational adjustment to cause said ground-working blade assembly to become tipped with respect to said frame, and such adjusted position of said sleeve and blade assembly will then be maintained by again tightening said clamping nut.

2. An adjustable implement mounting of the character described for use with a tractor including a triangular-shaped frame adapted to be adjustably secured on the rear of the tractor, said frame having a longitudinally-extending center bar, a rear extension of reduced size on said center bar, a tubular member on said rear extension, a sleeve slidable over said tubular member, a base plate rigidly connected with said sleeve, a ground-working blade assembly rotatably attached to said base plate, locking means on said base plate for holding said blade assembly against rotation with respect to said base plate, a ring on the forward end of said sleeve, radially-extending teeth on the forward face of said ring, a corresponding similar ring on the forward end of said tubular member, radially-extending teeth on the rear face of said latter mentioned ring adapted for engagement with the teeth on the opposed face of said first mentioned ring, an end section at the rear of said sleeve of reduced external diameter, an axial channel extending through said end section, a clamping link bolt connected to said rear extension of said center bar and extending through said channel, a clamping nut on the outer end of said bolt for exerting a forward thrust on said sleeve to cause said ring on the forward end of said sleeve to be held firmly in engaging contact with said ring on said tubular member, whereby, upon the loosening of said clamping nut, said sleeve can be given rotational adjustment to cause said ground-working blade assembly to become tipped with respect to said triangular-shaped frame, and such adjusted position of said sleeve and blade assembly will then be maintained by again tightening said clamping nut.

3. An adjustable implement mounting for use with ground-working means attached to a tractor including a triangular-shaped frame adapted to be secured on the rear of a tractor, said frame having a longitudinal, rearwardly-extending center bar assembly, a sleeve slidable over said center bar assembly, a base plate rigidly connected with said sleeve, ground-working means rotatably attached to said base plate, a ring flange on the forward end of said sleeve, radially-extending teeth on the forward face of said ring flange, an annular shoulder on said center bar assembly so located as to be adjacent said ring flange of said sleeve when said sleeve is in mounted position on said center bar assembly, radially-extending teeth on the rear face of said annular shoulder adapted for engagement with said teeth of said ring flange, an end section on the rear of said sleeve, a channel of reduced diameter extending through said end section, said center bar assembly terminating in a screw-threaded element of slightly less diameter than said channel and extending beyond the end of said end section when said sleeve is in place on said center bar assembly, and a removable clamping nut on the end of said threaded element adapted to engage the rear end of said sleeve and exert a forward thrust on said sleeve so as to cause the teeth on the ring flange of said sleeve to be held in engagement with said shoulder teeth when said sleeve and therewith said ground-working means have been set in desired position.

References Cited in the file of this patent

UNITED STATES PATENTS

| Number | Name | Date |
|---|---|---|
| 242,390 | Speer | May 31, 1881 |
| 316,846 | Snyder et al. | Apr. 28, 1885 |
| 931,928 | Hulce | Aug. 24, 1900 |
| 1,721,697 | Kipp | July 23, 1929 |
| 2,560,711 | Arps | July 17, 1951 |
| 2,579,553 | Daniel | Dec. 25, 1951 |